United States Patent
Shimada et al.

(10) Patent No.: US 10,501,875 B2
(45) Date of Patent: Dec. 10, 2019

(54) MELT-BLOWN NONWOVEN FABRIC AND METHOD OF MANUFACTURING SAME

(71) Applicant: Toray Industries, Inc., Tokyo (JP)

(72) Inventors: Daiki Shimada, Otsu (JP); Youhei Nakano, Otsu (JP); Yoshikazu Yakake, Kyoto (JP); Takuji Kobayashi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 119 days.

(21) Appl. No.: 15/504,378

(22) PCT Filed: Aug. 21, 2015

(86) PCT No.: PCT/JP2015/073473
§ 371 (c)(1),
(2) Date: Feb. 16, 2017

(87) PCT Pub. No.: WO2016/031693
PCT Pub. Date: Mar. 3, 2016

(65) Prior Publication Data
US 2017/0233913 A1    Aug. 17, 2017

(30) Foreign Application Priority Data

Aug. 27, 2014 (JP) .................................. 2014-172483
Mar. 4, 2015 (JP) .................................. 2015-042490
May 27, 2015 (JP) .................................. 2015-107322

(51) Int. Cl.
*D04H 3/14* (2012.01)
*H01M 2/14* (2006.01)
*H01M 2/16* (2006.01)

(52) U.S. Cl.
CPC ............... *D04H 3/14* (2013.01); *H01M 2/145* (2013.01); *H01M 2/162* (2013.01)

(58) Field of Classification Search
CPC ........ D04H 3/14; H01M 2/162; H01M 2/145; H01M 2/16
USPC .......................................................... 429/253
See application file for complete search history.

(56) References Cited

U.S. PATENT DOCUMENTS

| | | | |
|---|---|---|---|
| 2009/0286147 A1* | 11/2009 | Nakajima | H01G 9/02 429/145 |
| 2010/0003588 A1* | 1/2010 | Sudou | B32B 5/26 429/129 |
| 2011/0046590 A1* | 2/2011 | Mukai | A61F 13/15203 604/367 |
| 2011/0240210 A1* | 10/2011 | Terakawa | D04H 1/54 156/181 |
| 2012/0235316 A1* | 9/2012 | Nakano | D01D 5/0985 264/115 |
| 2014/0187115 A1 | 7/2014 | Nakano et al. | |

FOREIGN PATENT DOCUMENTS

| | | |
|---|---|---|
| CN | 101501892 A | 8/2009 |
| JP | 2002-018970 A | 1/2002 |
| JP | 2002-343329 A | 11/2002 |
| JP | 2004-047280 A | 2/2004 |
| JP | 2011-219873 A | 11/2011 |
| JP | 2013-536328 A | 9/2013 |

OTHER PUBLICATIONS

Extended European Search Report dated Jan. 9, 2018, of counterpart European Patent Application No. 15836602.1.
The First Office Action dated Jun. 29, 2018, of counterpart Chinese Application No. 20158004539.4, along with an English translation.

* cited by examiner

*Primary Examiner* — Gary D Harris
(74) *Attorney, Agent, or Firm* — DLA Piper LLP (US)

(57) ABSTRACT

A melt-blown nonwoven fabric includes a fiber containing a thermoplastic resin, wherein apparent density is 0.1 to 0.4 g/cm$^3$ and KES surface roughness of at least one surface of the fabric sheet is up to 1.2 μm; and a method of producing the fabric includes conveying a web of the nonwoven fabric by sandwiching the web between two belt conveyers each including a belt having a smooth surface, providing a heat treatment zone where a surface of one or both of the belt conveyers has been heated to a temperature not lower than cold crystallization temperature of the thermoplastic resin and not higher than the temperature −3° C. lower than melting temperature of the thermoplastic resin in at least a part of a course between the belts, and heating the nonwoven fabric web in the heat treatment zone by contacting both surfaces of the nonwoven fabric web with the belt.

12 Claims, No Drawings

MELT-BLOWN NONWOVEN FABRIC AND METHOD OF MANUFACTURING SAME

TECHNICAL FIELD

This disclosure relates to a melt-blown nonwoven fabric having good texture with no waviness or surface unevenness, and that also exhibits thermal size stability. This disclosure also relates to its production method.

BACKGROUND

Melt-blown nonwoven fabric is produced by ejecting a filament from spinning nozzles, spraying heated compressed air to the filaments to attenuate the filaments and cause self-fusion, depositing the thus ejected fiber on a collector apparatus to produce the nonwoven fabric. The fiber constituting the melt-blown nonwoven fabric is attenuated by spraying the compressed air and, therefore, oriented crystallization is less likely to occur and the as-produced nonwoven web may experience troubles such as deformation and breakage if it is further processed at a high temperature or used with no further processing. To avoid such troubles, it is important that the as-produced nonwoven web is imparted with thermal size stability, and a typical stabilization means is crystallization treatment by heating.

Typical conventional methods used for thermal crystallization of the nonwoven fabric include thermal compression by heated calendar rolls or embossed rolls, heat treatment by high-temperature heated fluid such as hot air or steam, and heat treatment by infrared heater. Of those heat treatment methods, the thermal compression suffers from the problems of poor workability due to irregular width shrinkage or wrinkling of the nonwoven web. That method also suffers from the problem of a drastic decrease in the gas flow rate due to the collapse of the sheet and, hence, increase in the density after the heat treatment.

In melt-blown nonwoven fabrics, heat treatment is generally conducted under tension by heating the nonwoven fabric with a high-temperature heated fluid or an infrared heater while holding its opposite ends by pins, clips, or other tenter device.

An exemplary heat treatment apparatus that has been proposed is an apparatus wherein consistent heating of the nonwoven web in its transverse direction has been realized by temperature control using a temperature sensor while holding the opposite ends of the nonwoven fabric by using a tenter device (see Japanese Unexamined Patent Publication (Kokai) No. 2002-18970). However, it was only the opposite ends of the nonwoven web that were held by the tenter device in the heat treatment conducted by that heat treatment apparatus, and there has been a problem that the nonwoven fabric frequently suffered from poor texture and waviness of the sheet (nonwoven web) due to partial sheet (nonwoven web) shrinkage with the progress of fiber fusion and inconsistent unit weight.

Also proposed are a method of processing a nonwoven web and a processing apparatus, wherein the nonwoven web is sandwiched between a punched endless belt and a fiber-conveying endless belt and hot air is ejected from the interior side to the exterior side of the punched endless belt to thereby heat the fiber in the hot air-penetrating regions (see Japanese Unexamined Patent Publication (Kokai) No. 2011-219873). However, a punched belt is used in the proposed processing apparatus for penetration of the hot air through the nonwoven web, and this in turn means that the hot air does not penetrate in the non-punched area of the belt. This resulted in the problems that the heat treatment of the fiber is likely to become inconsistent and, also, that the pattern of the punched area is transferred to the nonwoven web. In addition, due to the use of a metal belt having low ability to follow the nonwoven web, areas with insufficient holding is likely to be present in the nonwoven web, resulting in the problem that fiber shrinkage in such an area results in the poor texture.

As described above, there has been no method of producing a melt-blown nonwoven fabric that can impart sufficient thermal size stability to the nonwoven fabric without causing loss of texture or generation of waviness of the nonwoven web or transfer of the belt pattern to the nonwoven web that resulted in the surface unevenness of the nonwoven web in the heat treatment step.

Currently, the nonwoven fabrics are used in various industrial applications such as filters, abrasive cloth, and battery separators. Of those, the performance generally required for the nonwoven fabric in the use for a battery separator is the ability of separating the electrodes and preventing short-circuiting and the ability to retain the electrolyte. In a secondary battery, the nonwoven fabric used for the separator should allow passage of the gas generated by the reaction of the electrode.

Batteries are recently used in wider variety of environments with the progress in the development of various portable equipment and installed sensor and measuring instrument and, in some applications, there is a demand for batteries capable of fulfilling their performance even in the severe environment at high temperature under high impact load.

In such a situation, a separator prepared by using an annealed melt-blown nonwoven fabric of polyphenylene sulfide resin has been proposed for use as a separator in coin-type batteries (see Japanese Unexamined Patent Publication (Kokai) No. 2004-047280), and that procedure enables improvement in heat resistance as well as shrinkage resistance of the nonwoven fabric and production of a battery separator that is free from melting and deformation even at a high temperature. However, the separator of that proposal is associated with the risk of separator breakage and electrode damage in the application where impact load is applied. In addition, annealed nonwoven fabric suffers from the problems of increased variation in the thickness of the nonwoven fabric and gap generation between the electrode and the separator which may invite loss of liquid retention.

In view of such situation, a battery separator comprising a laminate of melt-blown polyphenylene sulfide nonwoven fabrics has been proposed (see Japanese Unexamined Patent Publication (Kokai) No. 2002-343329). That procedure certainly enabled decrease in the thickness of the separator with reduced variation in the thickness thereby improving close contact between the electrode and the separator. However, that proposal was associated with the problem of reduced liquid retention, namely, loss of the merit inherent to the nonwoven fabric and, also, with the problem of mutual adhesion of the fibers resulting in the reduced surface area of the fiber and, hence, in the risk of reduced liquid retention after prolonged use at a high temperature.

As described above, there has been no conventional battery separator that can retain sufficient discharge characteristic without experiencing troubles even when it is used for a long time in high temperature environment where impact load is applied.

In view of the situation as described above, it could be helpful to provide a melt-blown nonwoven fabric having good texture with no waviness or surface unevenness as well as excellent thermal size stability that does not experience drastic decrease in the gas flow rate in the heat treatment. It could also be helpful to provide a method of producing such melt-blown nonwoven fabric.

It could still further be helpful to provide a nonwoven fabric battery separator that exhibits excellent contact with the electrode and is well adapted for use under high temperature environment where impact load is applied without undergoing an increase in the density in the pressure application treatment.

SUMMARY

We thus provide melt-blown nonwoven fabric comprising a fiber containing a thermoplastic resin as its main component, wherein the apparent density is 0.1 to 0.4 g/cm$^3$ and KES surface roughness of at least one surface of the fabric sheet is up to 1.2 µm.

Preferably, dry heat shrinkage at a temperature of 200° C. of the nonwoven fabric is up to 2%.

Preferably, both tensile strength in machine direction and tensile strength in transverse direction of the nonwoven fabric are at least 10 N/15 mm.

Further preferably, KES surface roughness of both surfaces of the nonwoven fabric sheet is up to 1.6 µm.

Still further preferably, thickness of the nonwoven fabric is 0.12 to 0.35 mm.

Still further preferably, the thermoplastic resin which is the main component of the fiber constituting the nonwoven fabric is a polyphenylene sulfide resin or a polyester resin.

Further preferably, a nonwoven fabric battery separator produced by using the melt-blown nonwoven fabric.

The method produces a melt-blown nonwoven fabric and comprises the step of conveying a web of nonwoven fabric comprising a fiber containing a thermoplastic resin as its main component by sandwiching the web between two sets of belt conveyers each comprising a belt of flexible material having a smooth surface; wherein a heat treatment zone where surface of one or both of the two sets of the belt conveyers has been heated to a temperature not lower than cold crystallization temperature of the thermoplastic resin and not higher than the temperature −3° C. lower than melting temperature of the thermoplastic resin is provided in at least a part of the course where the nonwoven fabric is conveyed between the belts; and wherein the nonwoven web is heated in the heat treatment zone by bringing both surfaces of the nonwoven fabric web in contact with the belt conveyers.

Preferably, the Bekk smoothness of the belt is at least 0.5 second.

Preferably, the nonwoven web is conveyed at a speed of 0.1 to 10 m/minute.

Further preferably, time of the contact between the nonwoven web and the belt conveyers in the heat treatment zone is at least 3 seconds.

Still further preferably, the main component of the fiber constituting the nonwoven fabric is a polyphenylene sulfide resin or a polyester resin.

We enable production of a melt-blown nonwoven fabric that is free from heat shrinkage in the high-temperature usage and exhibits good texture with no waviness or surface unevenness without undergoing a drastic decrease in the gas flow rate in the course of heat treatment. The melt-blown nonwoven fabric has a surface with excellent abrasion resistance and it is well adapted for dust removal and backwashing, and accordingly, it can be used for a battery separator, filter, and other industrial applications.

DETAILED DESCRIPTION

Our melt-blown nonwoven fabric is a melt-blown nonwoven fabric comprising a fiber containing a thermoplastic resin as its main component, wherein apparent density is 0.1 to 0.4 g/cm$^3$ and KES surface roughness of at least one surface is up to 1.2 µm.

It is important that the nonwoven fabric has the apparent density of 0.1 to 0.4 g/cm$^3$. When the apparent density is adjusted to up to 0.4 g/cm$^3$, more preferably up to 0.38 g/cm$^3$, and still more preferably up to 0.35 g/cm$^3$, decrease in the gas flow rate can be suppressed to thereby produce a filter with reduced pressure loss and longer filter life. When using the nonwoven fabric for a battery separator by increasing the liquid retention capacity, production of a high capacity battery will be enabled. When the apparent density is at least 0.1 g/cm$^3$, preferably at least 0.12 g/cm$^3$, and more preferably at least 0.14 g/cm$^3$, loss in the strength by the decrease in number of the fiber contact points will be suppressed, and production of a nonwoven fabric having the practically acceptable strength and handling convenience will be enabled.

It is important that at least one surface of the nonwoven fabric has the KES surface roughness of up to 1.2 µm. When the KES surface roughness is up to 1.2 µm, abrasion resistance of the surface will be improved, and dust removal and backwashing will be facilitated when the nonwoven fabric is used as a filter, and the resulting filter will have an elongated filter life. Furthermore, when the melt-blown nonwoven fabric is used after adhering with a film such as PTFE film or other nonwoven fabric, adhesion can be easily accomplished and the resulting nonwoven fabric will exhibit excellent abrasion resistance. In addition, when the nonwoven fabric is used for the battery separator, damage of the electrode surface by the separator will be prevented even if the battery receives an impact load, and the improved contact between the separator and the electrode will result in the improved electrolyte retention at the interface between the electrode and the nonwoven fabric.

The KES surface roughness is not particularly limited for its lower limit. However, preferably, the KES surface roughness is at least 0.1 µm in view of preventing distortion of the nonwoven fabric caused by the heating and pressure increase in the production.

The KES surface roughness on both surface of the melt-blown nonwoven fabric is preferably up to 1.6 µm. When the KES surface roughness on both surface is up to 1.6 µm, preferably up to 1.4 µm, and more preferably up to 1.2 µm, damage of the electrode surface by the separator will be prevented even if the battery receives an impact load, and the improved contact between the separator and the electrode will result in the improved electrolyte retention at the interface between the electrode and the nonwoven fabric.

The melt-blown nonwoven fabric preferably has a dry heat shrinkage at the temperature of 200° C. of up to 2%, and more preferably up to 1%. When the dry heat shrinkage is in such range, the nonwoven fabric will not experience change in size or interior structure even in the use in high temperature environment. In consideration of when the nonwoven fabric is elongated by relaxation of tension or the like by heating, the dry heat shrinkage is preferably at least −2% and more preferably at least −1% and, in a preferred example, the dry heat shrinkage is approximately 0% to prevent change in size or interior structure in the use in high temperature environment.

Both tensile strength in machine direction and tensile strength in transverse direction of the nonwoven fabric are preferably at least 10 N/15 mm, more preferably at least 12 N/15 mm, and still more preferably at least 14 N/15 mm. When the tensile strength is in such range, breakage and damage of the separator can be prevented even if the battery receives impact load. While the example having a higher tensile strength is preferable, tensile strength is preferably up to 300 N/15 mm, and more preferably up to 200 N/15 mm to prevent excessively strong adhesion promoting the fusion between the fibers that results in the hard feeling.

Average filament diameter of the fiber constituting the nonwoven fabric is preferably of 0.1 to 10 µm. The average filament diameter is preferably up to 10 µm, more preferably up to 8 µm, and still more preferably up to 6 µm and, then, the nonwoven fabric will enjoy consistent unit weight to enable production of a filter with high collection efficiency. When such nonwoven fabric is used for a battery separator, pin hole generation and partial increase of electric resistance will be prevented.

The average filament diameter is preferably at least 0.1 µm, more preferably at least 0.5 µm, and still more preferably at least 1 µm and, then, fiber breakage and shot (polymer globule) formation can be suppressed in elongation of the polymer and attenuation of the fiber in the course of the production. Also, an increase in the pressure loss can be prevented when the nonwoven fabric is used for a filter.

The melt-blown nonwoven fabric may preferably have a thickness of the nonwoven fabric of 0.12 to 0.35 mm. The thickness of the nonwoven fabric is preferably up to 0.35 mm, more preferably up to 0.32 mm, and still more preferably up to 0.30 mm and, then, increase in the internal resistance of the battery will be suppressed and strong pressing of the electrode by the separator in the battery will be suppressed, and damage of the electrode will be prevented even if the battery receives impact load. The thickness is preferably at least 0.12 mm, more preferably at least 0.14 mm, and still more preferably at least 0.18 mm, and then, the contact between the separator and the electrode will be improved and the liquid retention will be maintained even in the case of elongated use at high temperature.

Examples of the nonwoven fabrics other than the melt-blown nonwoven fabric include spunbond nonwoven fabric, flash spun nonwoven fabric, wet-laid nonwoven fabric, carded nonwoven fabric, and air-laid nonwoven fabric. Of these, the spunbond nonwoven fabric, carded nonwoven fabric, and air-laid nonwoven fabric are likely to have an excessively high surface roughness due to the large fiber diameter and inferior unit weight consistency. The flash spun nonwoven fabric invites poor gas flow rate due to its high density.

Our method of producing a melt-blown nonwoven fabric is a method of producing a melt-blown nonwoven fabric comprising the step of conveying a web of nonwoven fabric comprising a fiber containing a thermoplastic resin as its main component by sandwiching the web between two sets of belt conveyers each comprising a belt of flexible material having a smooth surface; wherein a heat treatment zone where surface of one or both of the two sets of the belt conveyers has been heated to a temperature not lower than cold crystallization temperature of the thermoplastic resin and not higher than the temperature −3° C. lower than melting temperature of the thermoplastic resin is provided in at least a part of the course when the nonwoven fabric is conveyed between the belts; and wherein the nonwoven web is heated in the heat treatment zone by bringing both surfaces of the nonwoven web in contact with the belt conveyers.

It is important that, after melting the thermoplastic resin and extruding the molten thermoplastic resin from the spinning nozzle, a high-velocity heated gas fluid or the like is sprayed onto the fibers comprising the extruded molten resin to attenuate the fibers into minute fibers; the attenuated fibers are collected on the moving conveyer to form a sheet (these steps are hereinafter sometimes referred to as "formation" of a sheet); and the resulting nonwoven web is sandwiched between two sets of belt conveyers and the heat treatment of the nonwoven web is accomplished by bringing the nonwoven web in contact with the heated belt surface while the entire surface of the nonwoven web is sufficiently held between the belts. In such method, partial sheet (nonwoven web) shrinkage by progress of fiber fusion and inconsistent unit weight is suppressed, and the heat treatment of the nonwoven web can be accomplished without adverse effects on the texture or generation of waviness compared to the conventional heat treatment under tension wherein only some parts of the nonwoven web are held.

"One set of belt conveyer" means a set of belt conveyer installation equipped with an endless belt and a drive unit for rotating the belt.

When the nonwoven web formed is subjected to heat treatment, thickness of the web decreases with the progress of the fiber fusion and, therefore, the gap (clearance) between the belts of the two sets of belt conveyers sandwiching the nonwoven web is preferably up to 2 mm and simultaneously, less than the thickness of the melt-blown nonwoven fabric after the heat treatment to maintain the state that the entire nonwoven web is constantly held between the belts during the heat treatment.

It is important that the surface of the belts of the two sets of belt conveyers sandwiching the nonwoven web is smooth, and the surface of the conveyer belt contacting the nonwoven web preferably has a Bekk smoothness of at least 0.5 seconds, more preferably at least 1 second, still more preferably at least 2 seconds. When the Bekk smoothness is in such range, production of the nonwoven web is enabled and transfer of surface unevenness of the belt to the nonwoven web which is softened by the heating is prevented. In addition, the Bekk smoothness is preferably up to 1000 seconds, more preferably up to 500 seconds, and still more preferably up to 300 seconds to prevent adhesion of the melt-blown nonwoven fabric after the heat treatment to the belt surface and the resulting loss of workability.

It is also important that the conveyer belts used for sandwiching the nonwoven are the belts comprising a flexible material. The term "flexible" as used herein means that the material when used as a single sheet is flexible enough for use as the belt of the belt conveyer. Exemplary preferable materials for the belt include a belt of "Teflon" (registered trademark) resin (polytetrafluoroethylene resin) having a fiber material such as glass fiber braided as the core material. In the flexible belt, the belt can flexibly follow thickness inconsistency of the nonwoven web, and the entire nonwoven web will be sufficiently held by the belt conveyers sandwiching the entire nonwoven web. In contrast, nonflexible belts such as those prepared by connecting or arranging metal plates are less flexible and incapable of following minute thickness inconsistency of the nonwoven web due to the low flexibility of the belts, and this results in the risk of partial insufficient holding of the nonwoven web by the belts.

The conveyer belts sandwiching the nonwoven web may preferably have a thickness of 0.1 to 3 mm, more preferably 0.1 to 2 mm, and still more preferably 0.1 to 1 mm. When the thickness of the conveyer belt is in such range, the conveyer belt will retain its flexibility and the belt will follow inconsistent thickness of the nonwoven web thereby sufficiently holding the entire nonwoven web.

If desired, releasability of the nonwoven web or the conveyer belt can be improved by coating the surface belt before the heat treatment with a release agent or by covering the surface with a mold release sheet such as "Teflon" (registered trademark) resin (polytetrafluoroethylene resin) sheet to the extent not adversely affecting the merits of this disclosure.

It is important that the surface of one or both of the two sets of the belt conveyers is heated to a temperature not lower than cold crystallization temperature of the thermoplastic resin which is the main component of the nonwoven web in the zone where the nonwoven web is subjected to the heat treatment. By such adjustment of the surface temperature, the fiber constituting the nonwoven web will undergo thermal crystallization, and the nonwoven web will be imparted with thermal size stability.

It is also important that the surface temperature of the belt conveyer is not higher than the temperature −3° C. lower than melting temperature of the thermoplastic resin, and more preferably, the surface temperature of the belt conveyer is not higher than the temperature −30° C., and more preferably −60° C. lower than melting temperature of the thermoplastic resin to prevent softening of the nonwoven fabric and self-fusion of the fibers resulting in the generation of a film-like web and excessive progress of the fiber crystallization resulting in the crisp texture of the sheet before the progress of the thermal crystallization of the fiber.

Alternatively, the temperature of the belt conveyer surface may be incrementally changed in the heat treatment zone to thereby gradually heat or cool the nonwoven web. Also, before the heat treatment zone, a preheating zone may be provided where the temperature of the belt conveyer surface is not higher than the cold crystallization temperature of the thermoplastic resin.

Although contact time of the belt conveyer and the nonwoven web in the heat treatment zone depends on the type of the thermoplastic resin constituting the fiber of the nonwoven fabric as well as the unit weight and thickness of the nonwoven fabric, the contact time is preferably at least 3 seconds, more preferably at least 5 seconds, and still more preferably at least 10 seconds. When the contact time is as described above, entire nonwoven web will undergo sufficient heat treatment and the nonwoven web will be provided with excellent thermal size stability. The contact time is preferably up to 600 seconds, more preferably up to 300 seconds, and still more preferably up to 100 seconds to prevent loss of the productivity.

The nonwoven web is preferably conveyed by the belt conveyer at a speed of at least 0.1 m/minute, more preferably at least 0.5 m/minute, and still more preferably at least 1 m/minute. When conveyed at such speed, loss of production efficiency can be suppressed. The nonwoven web is also preferably conveyed at a speed of up to 10 m/minute, more preferably up to 8 m/minute, and still more preferably up to 6 m/minute to prevent softening of the nonwoven web resulting in the collapse of the web in thickness direction and fusion of fibers resulting in generation of a film-like web by the rapid heating before the progress of the thermal crystallization of the fiber.

Examples of the components mainly constituting the fiber of the melt-blown nonwoven fabric include thermoplastic resins such as polyphenylene sulfide, polyetherimide, polyethersulfone, polysulfone, polyphenylene ether, polyester, polyallylate, polyamide, polyamideimide, polycarbonate, polyolefin, and polyether ether ketone and thermoplastic resins produced by copolymerizing any one of such resins.

Of these, thermoplastic resins containing a polyphenylene sulfide resin or a polyester resin as its main component have good fiber spinnability while the nonwoven web after the web production suffers from the problem of extremely low thermal size stability. However, use of the method of producing the melt-blown nonwoven fabric enables provision of the thermal size stability to enable their use at high temperature.

"Mainly comprising" means that "the content of the component is at least 85% by weight including the case wherein the component is the sole constituent."

The fiber constituting the melt-blown nonwoven fabric may also contain nucleating agent, matting agent, pigment, fungicide, antimicrobial agent, flame retardant, light stabilizer, UV absorbent, antioxidant, filler, lubricating agent, hydrophilizing agent, and the like.

While the method of producing the melt-blown nonwoven fabric can accomplish the heat treatment with no adverse effects on the texture and without causing waviness even if the unit weight of the nonwoven web was low, the unit weight is preferably at least 10 g/m$^2$, and more preferably at least 20 g/m$^2$ to produce a melt-blown nonwoven fabric having practically acceptable mechanical strength. On the other hand, when the unit weight of the nonwoven web is too high, heating may become uneven in the thickness direction and crystallization by heat may not sufficiently proceed to the interior, and therefore, the unit weight is more preferably up to 400 g/m$^2$, and still more preferably up to 200 g/m$^2$.

Thickness of the nonwoven web formed is preferably up to 2 mm, and more preferably up to 1.5 mm. When the thickness is within such range, insufficient heating of the nonwoven web in the center in the thickness direction can be avoided, and crystallization by heating can be promoted to the interior to provide sufficient thermal size stability to the entire nonwoven web.

The thickness may be adequately adjusted depending on the intended application so that the apparent density of the melt-blown nonwoven fabric after the heat treatment is 0.1 to 0.4 g/cm$^3$ by adjusting the pressure applied to the nonwoven web by the two sets of belt conveyers on opposite surfaces, by providing nip rolls near the exit of the belt conveyer to apply pressure on the melt-blown nonwoven fabric after the heat treatment, or by combining these two methods during the conveying of the nonwoven web by the two sets of belt conveyers.

Next, the method of forming the melt-blown nonwoven fabric is described by referring to the preferred examples.

A melt blowing method is a method of producing a nonwoven fabric requiring the steps of melting a resin, extruding the molten resin from spinning nozzles, injecting a high velocity heated gas fluid or the like toward the extruded molten resin to elongate and attenuate the resin in fiber form, and collecting the fibers onto a moving conveyer to thereby form a sheet-form fibers.

Preferably, the thermoplastic resin which is the main component of the fibers constituting the melt-blown nonwoven fabric has a MFR measured according to ASTM D1238-70 (measurement load, 5 kg weight) at a temperature of melting point +34.5° C. of 100 to 2000 g/10 minutes. When the MFR is at least 100 g/10 minutes and preferably at least 150 g/10 minutes, resin flowability will be improved and attenuation into fine fibers will be facilitated. On the other hand, when the MFR is up to 2000 g/10 minutes, and more preferably up to 1500 g/10 minutes, back pressure of the nozzle will be adequate and this will result in the high spinning stability.

The temperature of the extruder used for melting the resin and the temperature of the spinning nozzle are preferably a temperature 10 to 50° C. higher than the melting point of the resin used. When the temperature of the extruder used for melting the resin is too low, the resin will be solidified or less flowable, while excessively high temperature results in the accelerated resin deterioration.

The temperature of the high velocity heated gas is preferably at least 0° C. higher than the spinning temperature for efficient attenuation of the fiber and, also, to produce a melt-blown nonwoven fabric having a practically acceptable strength by the self-fusion of the fibers. Preferably, the temperature is up to 30° C., more preferably up to 25° C., still more preferably up to 20° C. higher than the spinning temperature in view of suppressing the shot (polymer globule) formation and stably producing the nonwoven fabric.

The melt-blown nonwoven fabric is highly adapted for use as filters and other industrial applications since it has high gas flow rate, high abrasion resistance, and high smoothness that facilitates dust removal and backwashing. When the melt-blown nonwoven fabric is used as a battery separator, it can retain sufficient discharge characteristic without undergoing troubles such as melting and breakage of the separator or damage in the electrode even when it is used in in a high temperature environment where impact load is applied, and accordingly, it is well adapted for use in the application such as monitoring system of tire air pressure.

EXAMPLES

Next, the method of producing a melt-blown nonwoven fabric is described in further detail by referring to the Examples, which by no means limit the scope of this disclosure.

Measurement Method (1) Melt Flow Rate (MFR) (g/10 Minutes)

MFR of the polyphenylene sulfide resin was measured according to ASTM D1238-70 under the conditions of measurement temperature of 315.5° C. and measurement load of 5 kg. The measurement was conducted 3 times, and the average was used as the MFR.

(2) Intrinsic Viscosity (IV)

Intrinsic viscosity IV of the polyethylene terephthalate resin was measured 3 times by the procedure as described below, and the average was used. First, 8 g of the sample was dissolved in 100 ml of o-chlorophenol, and relative viscosity $\eta_r$ was measured at a temperature of 25° C. by using Ostwald viscometer by the following equation:

$$\eta_r = \eta/\eta_0 = (t \times d)/(t_0 \times d_0)$$

wherein $\eta$ is viscosity of the polymer solution, $\eta_0$ is the viscosity of o-chlorophenol, t is time (second) required for the falling of the solution, d is density (g/cm³) of the solution, $t_0$ is time (second) required for the falling of the o-chlorophenol, and $d_0$ is density (g/cm³) of the o-chlorophenol. Next, intrinsic viscosity IV was calculated from the relative viscosity $\eta_r$ by the following equation:

$$IV = 0.0242\eta_r + 0.2634.$$

(3) Melting Point (° C.)

The thermoplastic resins used were evaluated for their melting point by using a differential scanning calorimeter (Q100 manufactured by TA Instruments). The measurement was conducted three times under the following conditions, and average of the endothermic peak temperature was calculated and used as the melting point of the resin measured. When the thermoplastic resin before the fiber formation has two or more endothermic peaks, the peak temperature on the highest side is adopted. When the fiber is measured, similar measurement can be conducted to estimate the melting point of each component from the two or more endothermic peaks.

Measurement atmosphere: nitrogen stream (150 ml/minute)

Temperature range: 30 to 350° C.

Temperature elevation speed: 20° C./minute

Sample quantity: 5 mg (4) Average Filament Diameter (μm)

10 small samples were randomly collected from the nonwoven web on the conveyer belt, and picture of the sample surface was taken by using microscope at a magnification of 1000 to 2000. Width of the fiber was measured for 10 fibers of each sample, namely, for the total of 100 fibers, and the average calculated. The average was rounded off to the first decimal place for use as the fiber diameter.

(5) Unit Weight of the Nonwoven Fabric (g/m²)

Three test pieces of 20 cm×25 cm were collected per 1 m width of the sample according to 6.2 of JIS L1913 (2010 edition) "Determination of mass per unit area," and mass (g) of each test piece at standard state was measured. Average was calculated for use as the mass (g/m²) per 1 m².

(6) Thickness of the Nonwoven Fabric and the Conveyer Belt (Mm)

The thickness of the nonwoven fabric and the conveyer belt was measured to the unit of 0.01 mm according to 5.1 of JIS L1906 (2000 edition) by using a penetrator having a diameter of 10 mm at a load of 10 kPa. The measurement was conducted for 10 points in the width direction at a regular interval. The average was calculated and rounded off to the second decimal place.

(7) Apparent Density of the Nonwoven Fabric (g/Cm³)

Unit weight of the nonwoven fabric was divided by the thickness to calculate the apparent density.

(8) Dry Heat Shrinkage of the Nonwoven Fabric (%)

Dry heat shrinkage of the nonwoven fabric was measured according to 6.10.3 of JIS L1913 (2010 edition). Interior of the thermostat dryer was kept at a temperature of 200° C., and heat treatment conducted for 10 minutes.

(9) Bekk Smoothness of the Belt Surface (Second)

Bekk smoothness of the surface of the conveyer belt that becomes in contact with the nonwoven web was measured according to JIS P8119 (1998 edition) by using Bekk smoothness tester. The measurement was conducted for 10 points in the width direction at a regular interval. The average was rounded off to the first decimal place for use as the Bekk smoothness.

(10) Evaluation of Exterior Appearance of the Nonwoven Fabric

The nonwoven web before the heat treatment and the melt-blown nonwoven fabric after the heat treatment were compared by visual inspection for waviness of the sheet, surface texture, and surface unevenness. In Table 1, the result are evaluated "A" for each item when no change was found before and after the heat treatment, "B" in the case when the result after the heat treatment was slightly inferior, and "C" when the result was inferior after the heat treatment. When the entire nonwoven web was sufficiently held, no change in the outer appearance was found before and after the heat treatment while waviness and inferior texture were found when the holding of the nonwoven web was insufficient.

(11) KES Surface Roughness (μm)

A sheet of 20 cm×20 cm was cut out from the nonwoven fabric, and surface roughness of opposite surfaces of the sheet was measured by using KES-FB4-AUTO-A automatic surface tester manufactured by KatoTech. The specimen was set with a load of 400 g applied thereto, and measurement in the machine direction and the transverse direction was conducted 3 times by bringing a contact probe for surface roughness measurement having a load of 10 g applied thereto in contact with the sample. The average was used for the surface roughness (μm).

(12) Gas Flow Rate of the Nonwoven Fabric (cc/cm$^2$/Second)

10 fiber sheets (15 cm×15 cm) were measured according to Fragier method of JIS L1913 (2010) by using gas flow tester FX3300 manufactured by TEXTEST at a test pressure of 125 Pa. Average of the value obtained was rounded off to the first decimal place for use as the gas flow rate.

(13) Abrasion Resistance of the Nonwoven Fabric

Gakushin-Type rubbing test was conducted according to 9.2 of JIS L0849 (2013 edition). The surface of the nonwoven fabric was rubbed by a friction probe covered by a white cotton fabric for abrasion for 500 reciprocal cycles, and the surface condition of the test piece before and after the test inspected by both visual inspection and observation using a scanning electron microscope (SEM). In Table 1, the result are evaluated "5" when no change was found before and after the test by SEM observation, "4" when slight fluffiness was confirmed by SEM observation while the fluffiness was ambiguous by visual inspection, "3" when clear fluffiness was found by SEM observation while the fluffiness was ambiguous by visual inspection, "2" when the fluffiness was confirmed by visual inspection, and "1" when the sheet could not hold its sheet shape.

(14) Tensile Strength of the Nonwoven Fabric (N/15 mm)

Tensile strength of the nonwoven fabric was measured according to 9.1 of JIS P8113 (2006 edition) by using conditions including sample size of 15 mm×28 cm, grip interval of 18 cm, and tensile speed of 20 mm/minute. The tensile test was conducted for 3 points, and the measurement was conducted in machine direction (longitudinal direction) and transverse direction (width direction) for each point. Average of the strength upon breakage of the sample was used for the tensile strength (N/15 mm).

(15) Evaluation of Battery Properties

For the coin type lithium batteries prepared in the Examples 6 to 10 and Comparative Examples 3 to 6 as described below, closed circuit voltage when a current of 30 mA was passed at a load resistance of 100Ω for 5 seconds was measured under the temperature conditions of −10° C., and average of 10 batteries are shown Table 3. The batteries prepared were left in the environment of 120° C. for 10 days to evaluate current properties after high-temperature storage test, and the closed circuit voltage after high-temperature storage test was measured by the same procedure. The results are shown in Table 3 as the closed circuit voltage after the high temperature storage test.

(16) Impact Resistance Test

Impact resistance test was conducted by adhering the coin type lithium battery prepared in the Examples 6 to 10 and Comparative Examples 3 to 6 as described below on the interior of a tire having the outer diameter of 77 cm, and rotating the tire by pressing the tire against a drum rotating at a speed of 100 km/hr to thereby conduct the impact resistance test for 14 days. The battery after the test was measured for its closed circuit voltage by the procedure described in the "Evaluation of battery properties" as described above, and the results are shown in Table 3.

Example 1

Spinning and Sheet Formation

A polyphenylene sulfide (PPS) resin having a MFR of 600 g/10 minutes and a melting point of 281° C. was dried in nitrogen atmosphere at a temperature of 150° C. for 24 hours before its use. This polyphenylene sulfide resin was melted in an extruder and ejected from a spinning nozzle having a nozzle size (diameter) φ of 0.40 mm at a spinning temperature of 310° C. and a single nozzle ejection rate of 0.23 g/minute. Compressed air which had been heated to a temperature of 325° C. by an air heater was sprayed to the ejected fiber at a pressure of 0.15 MPa, and the ejected fibers were collected on the moving belt conveyer located at a distance 100 mm from the spinning nozzle to obtain a nonwoven web having a unit weight of 80 g/m$^2$ and a thickness of 0.40 mm. The fiber constituting the resulting nonwoven web had an average fiber diameter of 4.6 μm, and no shot (polymer globule) formation was observed during the 1 hour spinning. A good spinnability was thereby demonstrated.

Heat Treatment of the Nonwoven Fabric

Two sets of belt conveyers each having a belt of "Teflon" (registered trademark) resin having glass fibers interwoven therein as a core material having the belt thickness of 0.31 mm and Bekk smoothness of the belt surface of 2.6 seconds were vertically arranged so that the clearance between the belts was 0. The collected nonwoven web was placed between the belt conveyers and passed at a speed of 2 m/minute with the entire surface of the nonwoven web held between the belts, and the nonwoven web was passed through the 1 m heat treatment zone where the surface temperature of the upper and the lower belts had been heated to 140° C. to thereby conduct the heat treatment for 30 seconds. The melt-blown nonwoven fabric after the dry heat treatment had a thickness of 0.27 mm, and the heat shrinkage was 0%. No waviness, texture damage, or surface unevenness was observed. The results are shown in FIG. 1.

Physical Properties of the Nonwoven Fabric

The nonwoven fabric after the heat treatment had an apparent density of 0.30 g/cm$^3$ while the tensile strength was 25.5 N/15 mm in machine direction and 18.7 N/15 mm in transverse direction. The gas flow rate was 14.1 cc/cm$^2$/second while the surface roughness was 1.08 μm on the side opposite to the collector net and 1.26 μm on the side of the collector net. No change in the surface condition of the test piece was found before and after the Gakushin-Type rubbing test.

Example 2

Spinning and Sheet Formation

A nonwoven web was formed under the same conditions as the Example 1.

Heat Treatment of the Nonwoven Fabric

By using the belt conveyers the same as those used in Example 1, the nonwoven web was passed at a speed of 10 m/minute through the heat treatment zone where the surface temperature of the upper and the lower belts had been heated to 200° C. to thereby conduct the heat treatment for 6 seconds. The melt-blown nonwoven fabric after the heat treatment had a thickness of 0.22 mm, and the heat shrinkage was 0%. The melt-blown nonwoven fabric also had a thickness less than that of the melt-blown nonwoven fabric obtained in the Example 1. No waviness or surface unevenness was observed while the texture was slightly inferior compared to the melt-blown nonwoven fabric obtained in the Example 1. The results are shown in FIG. 1.

Physical Properties of the Nonwoven Fabric

The nonwoven fabric after the heat treatment had an apparent density of 0.36 g/cm3 while the tensile strength was 27.3 N/15 mm in machine direction and 20.2 N/15 mm in transverse direction. The gas flow rate was 13.2 cc/cm2/second while the surface roughness was 0.95 μm on the side opposite to the collector net and 1.10 μm on the side of the collector net. No change in the surface condition of the test piece was found before and after the Gakushin-Type rubbing test.

Example 3

Spinning and Sheet Formation

A polyphenylene sulfide resin the same as the one used in Example 1 was used for the starting material. The spinning was conducted in the same conditions as Example 1 except that the single nozzle ejection rate was 0.38 g/minute, and the hot air pressure was 0.15 MPa, and the ejected fibers were collected on the moving belt conveyer located at a distance 130 mm from the spinning nozzle to obtain a nonwoven web having a unit weight of 200 g/m2 and a thickness of 1.20 mm. The fiber constituting the resulting nonwoven web had an average fiber diameter of 8.0 μm, and no shot (polymer globule) formation was observed during the 1 hour spinning. A good spinnability was thereby demonstrated.

Heat Treatment of the Nonwoven Fabric

The collected nonwoven web was heat-treated by using the same conditions as those of Example 1. The melt-blown nonwoven fabric after the heat treatment had a thickness of 0.85 mm, and the dry heat shrinkage was 0%. No waviness, texture damage, or surface unevenness was observed. The results are shown in FIG. 1.

Physical Properties of the Nonwoven Fabric

The nonwoven fabric after the heat treatment had an apparent density of 0.24 g/cm3 while the tensile strength was 60.2 N/15 mm in machine direction and 44.3 N/15 mm in transverse direction. The gas flow rate was 3.8 cc/cm2/second while the surface roughness was 1.17 μm on the side opposite to the collector net and 1.36 μm on the side of the collector net. No change in the surface condition of the test piece was found before and after the Gakushin-Type rubbing test.

Example 4

Spinning and Sheet Formation

A nonwoven web was formed under the same conditions as the Example 1.

Heat Treatment of the Nonwoven Fabric

By using two sets of belt conveyers each having a belt of "Teflon" (registered trademark) resin having glass fibers interwoven therein as a core material having Bekk smoothness of the belt surface of 1.0 second, the nonwoven web was heat treated in the same conditions as those of Example 1. The melt-blown nonwoven fabric after the dry heat treatment had a thickness of 0.27 mm, and the heat shrinkage was 0%. No waviness or surface unevenness was observed while the texture was slightly inferior compared to the melt-blown nonwoven fabric obtained in the Example 1. The results are shown in FIG. 1.

Physical Properties of the Nonwoven Fabric

The nonwoven fabric after the heat treatment had an apparent density of 0.30 g/cm3 while the tensile strength was 24.5 N/15 mm in machine direction and 18.3 N/15 mm in transverse direction. The gas flow rate was 15.5 cc/cm2/second while the surface roughness was 1.10 μm on the side opposite to the collector net and 1.32 μm on the side of the collector net. No change in the surface condition of the test piece was found before and after the Gakushin-Type rubbing test.

Example 5

Spinning and Sheet Formation

A polyethylene terephthalate (PET) resin having an intrinsic viscosity of 0.51 and a melting point of 260° C. was dried in nitrogen atmosphere at a temperature of 150° C. for 24 hours before its use. This polyethylene terephthalate resin was melted in an extruder and ejected from a spinning nozzle having a nozzle size (diameter) φ of 0.40 mm at a spinning temperature of 300° C. and a single nozzle ejection rate of 0.21 g/minute. Compressed air which had been heated to a temperature of 320° C. by an air heater was sprayed to the ejected fiber at a pressure of 0.13 MPa, and the ejected fibers were collected on the moving belt conveyer located at a distance 150 mm from the spinning nozzle to obtain a nonwoven web having a unit weight of 80 g/m2 and a thickness of 0.42 mm. The fiber constituting the resulting nonwoven web had an average fiber diameter of 2.8 μm, and no shot (polymer globule) formation was observed during the 1 hour spinning. A good spinnability was thereby demonstrated.

Heat Treatment of the Nonwoven Fabric

The collected nonwoven web was heat treated under the same conditions as Example 1. The melt-blown nonwoven fabric after the dry heat treatment had a thickness of 0.36 mm, and the heat shrinkage was 0%. No waviness, texture damage, or surface unevenness was observed. The results are shown in FIG. 1.

Physical Properties of the Nonwoven Fabric

The nonwoven fabric after the heat treatment had an apparent density of 0.22 g/cm3 while the tensile strength was 19.8 N/15 mm in machine direction and 14.5 N/15 mm in transverse direction. The gas flow rate was 11.0 cc/cm2/second while the surface roughness was 0.95 μm on the side opposite to the collector net and 1.08 μm on the side of the collector net. No change in the surface condition of the test piece was found before and after the Gakushin-Type rubbing test.

Comparative Example 1

Spinning and Sheet Formation

A nonwoven web was formed under the same conditions as the Example 1.

Heat Treatment of the Nonwoven Fabric

The heat treatment was conducted under the same conditions as those of Example 1 except that the clearance between the belts conveying the nonwoven web was 1.0 mm. Since the clearance between the belts was greater than the thickness (0.40 mm) of the nonwoven web formed, only the lower belt was in contact with the nonwoven fabric during the heat treatment, and the nonwoven web was not held between the belts. The melt-blown nonwoven fabric after the heat treatment had been thermally shrunk by 30% in the transverse direction compared with the width before the heat treatment, and the thickness was 0.37 mm. While the dry heat shrinkage was 0% with no observation of the surface unevenness, the texture was inferior and waviness was observed over the entire sheet. The results are shown in FIG. 1.

Physical Properties of the Nonwoven Fabric

The nonwoven fabric after the heat treatment had an apparent density of 0.22 g/cm$^3$ while the tensile strength was 14.6 N/15 mm in machine direction and 9.8 N/15 mm in transverse direction. The gas flow rate was 18.4 cc/cm$^2$/second while the surface roughness was 3.30 µm on the side opposite to the collector net and 3.92 µm on the side of the collector net. When the test piece surface was examined before and after the Gakushin-Type rubbing test by SEM, the surface was fluffy after the test.

Comparative Example 2

Spinning and Sheet Formation

A nonwoven web was formed under the same conditions as the Example 1.

Heat Treatment of the Nonwoven Fabric

The nonwoven web was conveyed at a speed of 1 m/minute while being held only by pin tenter devices at opposite end of the nonwoven web, and the heat treatment was conducted by spraying hot air at 140° C. for 60 seconds. The melt-blown nonwoven fabric after the dry heat treatment had a thickness of 0.26 mm, and the dry heat shrinkage was 0%. While no surface unevenness was found, waviness was observed over the entire sheet, and the texture was inferior. The results are shown in FIG. 1.

Physical Properties of the Nonwoven Fabric

The nonwoven fabric after the heat treatment had an apparent density of 0.31 g/cm$^3$ while the tensile strength was 25.3 N/15 mm in machine direction and 18.8 N/15 mm in transverse direction. The gas flow rate was 16.8 cc/cm$^2$/second while the surface roughness was 1.35 µm on the side opposite to the collector net and 1.62 µm on the side of the collector net. When the test piece surface was compared before and after the Gakushin-Type rubbing test, the surface was fluffy after the test by visual inspection.

Comparative Example 3

Spinning and Sheet Formation

A nonwoven web was formed under the same conditions as the Example 1.

Heat Treatment of the Nonwoven Fabric

Two sets of belt conveyers each having a SUS plain weave mesh belt (mesh number, 50; wire diameter 0.22 mm; open area, 32%) with Bekk smoothness of the belt surface of 0 seconds (not higher than the measuring limit) were used, and the heat treatment conducted in the same conditions as those of Example 1. The melt-blown nonwoven fabric after the heat treatment had a thickness of 0.26 mm, and the dry heat shrinkage was 0%, whereas slight waviness of the sheet was observed. The nonwoven fabric also exhibited inferior texture and wrinkling due to the insufficient holding during the heat treatment. The nonwoven fabric also exhibited surface unevenness since it had the mesh pattern of the belt transferred to the sheet surface. The results are shown in FIG. 1.

Physical Properties of the Nonwoven Fabric

The nonwoven fabric after the heat treatment had an apparent density of 0.31 g/cm$^3$ while the tensile strength was 26.1 N/15 mm in machine direction and 17.2 N/15 mm in transverse direction. The gas flow rate was 17.3 cc/cm$^2$/second while the surface roughness was 2.11 µm on the side opposite to the collector net and 2.29 µm on the side of the collector net. When the test piece surface was examined before and after the Gakushin-Type rubbing test by SEM, the surface was fluffy after the test.

Evaluation of the Battery Properties

A coin type lithium battery was prepared in the same conditions as those of Example 6 to evaluate the battery properties. The nonwoven fabric exhibited good blanking workability, and the resulting battery exhibited a closed circuit voltage of 2.64 V while the closed circuit voltage after the high-temperature storage test was 2.36 V. The closed circuit voltage after the impact resistance test was 1.33 V. The results are shown in FIG. 3.

Comparative Example 4

Spinning and Sheet Formation

A polyphenylene sulfide resin the same as the one used in Example 1 was used for the starting material. The spinning was conducted in the same conditions as Example 1 except that the hot air pressure was 0.18 MPa, and the ejected fibers were collected on the moving belt conveyer located at a distance 100 mm from the spinning nozzle to obtain a nonwoven web having a unit weight of 80 g/m$^2$ and a thickness of 0.39 mm. The fiber constituting the resulting nonwoven web had an average fiber diameter of 3.6 µm, and no shot (polymer globule) formation was observed during the 1 hour spinning. A good spinnability was thereby demonstrated.

Heat Treatment of the Nonwoven Fabric

The heat treatment temperature of the resulting nonwoven web was conducted in the same conditions as those of Comparative Example 2. The melt-blown nonwoven fabric after the heat treatment had a thickness of 0.26 mm, and the dry heat shrinkage was 0%. Despite the observation of no surface unevenness, waviness was found over the entire sheet, and the texture was slightly inferior. After the heat treatment, the melt-blown nonwoven fabric was calendared by metal calendar rolls heated to a temperature of 130° C. under the conditions of a linear pressure of 50 kg/cm and a speed of 2 m/minute. The nonwoven fabric after the calendaring had a thickness of 0.10 mm, and the dry heat shrinkage was 0%. The waviness over the entire sheet that had been observed after the heat treatment was eliminated by conducting the calendaring, while the calendaring did not affect the texture or the state of surface unevenness. The result after the calendaring is shown in Table 1 as the evaluation result of exterior appearance of the nonwoven fabric.

Physical Properties of the Nonwoven Fabric

The nonwoven fabric after the heat treatment had an apparent density of 0.80 g/cm$^3$ while the tensile strength was 25.9 N/15 mm in machine direction and 19.4 N/15 mm in transverse direction. The gas flow rate was 3.1 cc/cm$^2$/second while the surface roughness was 0.57 µm on the side opposite to the collector net and 0.62 µm on the side of the collector net. No change in the surface condition of the test piece was found before and after the Gakushin-Type rubbing test.

Evaluation of the Battery Properties

A coin type lithium battery was prepared in the same conditions as those of Example 6 to evaluate the battery properties. The nonwoven fabric exhibited good blanking workability, and the resulting battery exhibited a closed circuit voltage of 2.61 V while the closed circuit voltage after the high-temperature storage test was 2.39 V. The closed circuit voltage after the impact resistance test was 2.26 V. The results are shown in FIG. 3.

TABLE 1

| | | Unit | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|---|
| Resin | Main component | — | PPS | PPS | PPS | PPS | PET | PPS | PPS | PPS | PPS |
| | Melting point | °C. | 281 | 281 | 281 | 281 | 260 | 281 | 281 | 281 | 281 |
| | MFR | g/10 min | 600 | 600 | 600 | 600 | — | 600 | 600 | 600 | 600 |
| | IV | — | — | — | — | — | 0.51 | — | — | — | — |
| Spinning | Spinning temperature | °C. | 310 | 310 | 310 | 310 | 300 | 310 | 310 | 310 | 310 |
| | Nozzle diameter | mm | φ 0.40 | φ 0.40 | φ 0.40 | φ 0.40 | φ 0.40 | φ 0.40 | φ 0.40 | φ 0.40 | φ 0.40 |
| | Amount extruded from single nozzle | g/min | 0.23 | 0.23 | 0.38 | 0.23 | 0.21 | 0.23 | 0.23 | 0.23 | 0.23 |
| | Hot air temperature | °C. | 325 | 325 | 325 | 325 | 320 | 325 | 325 | 325 | 325 |
| | Hot air pressure | MPa | 0.15 | 0.15 | 0.15 | 0.15 | 0.13 | 0.15 | 0.15 | 0.15 | 0.18 |
| | Average fiber diameter | μm | 4.6 | 4.6 | 8.0 | 4.6 | 2.8 | 4.6 | 4.6 | 4.6 | 3.6 |
| Fabric production | Unit weight | g/m² | 80 | 80 | 200 | 80 | 80 | 80 | 80 | 80 | 80 |
| | Thickness | mm | 0.40 | 0.40 | 1.20 | 0.40 | 0.42 | 0.40 | 0.40 | 0.40 | 0.39 |
| Heat treatment | Belt material | — | "Teflon" resin | "Teflon" resin | "Teflon" resin | "Teflon" resin | "Teflon" resin | "Teflon" resin | — | SUS | — |
| | Belt thickness | mm | 0.31 | 0.31 | 0.31 | 0.31 | 0.31 | 0.31 | — | — | — |
| | Bekk smoothness of the belt surface | sec | 2.6 | 2.6 | 2.6 | 1.0 | 2.6 | 2.6 | — | 0 | — |
| | Belt clearance | mm | 0 | 0 | 0 | 0 | 0 | 1.0 | — | 0.2 | — |
| | Conveying speed | m/min | 2 | 10 | 2 | 2 | 2 | 2 | 1 | 2 | 1 |
| | Heat treatment Temperature | °C. | 140 | 200 | 140 | 140 | 140 | 140 | 140 | 140 | 140 |
| | Heat treatment time | sec | 30 | 6 | 30 | 30 | 30 | 30 | 60 | 30 | 60 |
| Physical properties and outer appearance | Thickness | mm | 0.27 | 0.22 | 0.85 | 0.27 | 0.36 | 0.37 | 0.26 | 0.26 | 0.10 |
| | Apparent density | g/cm³ | 0.30 | 0.36 | 0.24 | 0.30 | 0.22 | 0.22 | 0.31 | 0.31 | 0.80 |
| | Tensile strength (MD/TD) | N/15 mm | 25.5/18.7 | 27.3/20.2 | 60.2/44.3 | 24.5/18.3 | 19.8/14.5 | 14.6/9.8 | 25.3/18.8 | 26.1/17.2 | 25.9/19.4 |
| | Dry heat shrinkage | % | 0 | 0 | 0 | 0 | 0 | 0 | 0 | 0 | 0 |
| | Waviness | — | A | A | A | A | A | C | C | B | A |
| | Texture | — | A | B | A | B | A | C | C | C | C |
| | Surface unevenness | — | A | A | A | A | A | A | A | C | A |
| | Gas flow rate | cc/cm²/sec | 14.1 | 13.2 | 3.8 | 15.5 | 11.0 | 18.4 | 16.8 | 17.3 | 3.1 |
| | Surface roughness (non-collector net side/collector net side) | μm | 1.08/1.26 | 0.95/1.10 | 1.17/1.36 | 1.10/1.32 | 0.95/1.08 | 3.30/3.92 | 1.35/1.62 | 2.11/2.29 | 0.57/0.62 |
| | Abrasion resistance | — | 5 | 5 | 5 | 5 | 5 | 3 | 2 | 3 | 5 |

(Note)
"Teflon" (registered trademark) resin: polytetrafluoroethylene resin

As shown in Table 1, the melt-blown nonwoven fabric obtained by contact heat treatment at a temperature not lower than cold crystallization temperature of the thermoplastic resin and not higher than the temperature −3° C. lower than melting temperature of the thermoplastic resin by sufficiently holding the entire surface of the nonwoven web by the belt conveyers each having the flexible belt was a nonwoven fabric with good texture and excellent thermal size stability with no waviness of the sheet or surface unevenness.

In addition, the melt-blown nonwoven fabrics exhibited lower surface roughness and superior abrasion resistance compared to the nonwoven fabrics of the Comparative Examples 1 to 3 and higher gas flow rate compared to the calendared nonwoven fabric of the Comparative Example 4.

Example 6

Spinning and Sheet Formation

A polyphenylene sulfide (PPS) resin having a MFR of 600 g/10 minutes and a melting point of 281° C. was dried in nitrogen atmosphere at a temperature of 150° C. for 24 hours before its use. This polyphenylene sulfide resin was melted in an extruder and ejected from a spinning nozzle having a nozzle size (diameter) φ of 0.40 mm at a spinning temperature of 310° C. and a single nozzle ejection rate of 0.23 g/minute. Compressed air which had been heated to a temperature of 325° C. by an air heater was sprayed to the ejected fiber at a pressure of 0.20 MPa, and the ejected fibers were collected on the moving belt conveyor located at a distance 100 mm from the spinning nozzle to obtain a nonwoven fabric having a unit weight of 80 g/m² and a thickness of 0.38 mm. The fiber constituting the resulting nonwoven web (nonwoven fabric) had an average fiber diameter of 2.6 µm, and no shot (polymer globule) formation was observed during the 1 hour spinning. A good spinnability was thereby demonstrated.

Heat Treatment of the Nonwoven Fabric

Two belt conveyers each having a belt of "Teflon" (registered trademark) resin having glass fibers interwoven therein as a core material having the belt thickness of 0.34 mm and Bekk smoothness of the belt surface of 2.6 seconds were vertically arranged so that the clearance between the belts was 0. The collected nonwoven fabric was conveyed between the belt conveyers at a speed of 2 m/minute with the entire surface held between the belts, and the nonwoven fabric was passed through the 1 m heat treatment zone where the surface temperature of the upper and the lower belts had been heated to 140° C. to thereby conduct the heat treatment for 30 seconds. The nonwoven fabric after the dry heat treatment had a thickness of 0.27 mm, and the dry heat shrinkage was 0%. No waviness, texture damage, or surface unevenness was observed. The results are shown in FIG. 2.

Physical Properties of the Nonwoven Fabric

The nonwoven fabric after the heat treatment had an apparent density of 0.30 g/cm$^3$ while the tensile strength was 28.0 N/15 mm in machine direction and 20.6 N/15 mm in transverse direction. The surface roughness was 0.93 µm on the side opposite to the collector net and 1.06 µm on the side of the collector net.

Evaluation of the Battery Properties

The resulting nonwoven fabric was blanked at a diameter of 16 mm. The blanked nonwoven fabric was used for the separator of a coin type lithium battery having a diameter of 20 mm and a height of 3.2 mm, and this battery was used for the evaluation of the battery properties. The nonwoven fabric exhibited good blanking workability. A nickel-plated stainless steel plate was used for the negative electrode terminal plate of the battery, and a lithium plate having a diameter of 16 mm and a thickness of 0.6 mm was secured with pressure on the interior side of the negative electrode terminal plate for use as a negative electrode. A positive electrode compound was prepared by mixing 92% by weight of manganese oxide with 7% by weight of graphite as the conductive material and 1% by weight of polytetrafluoroethylene as the binder, and a positive electrode having a diameter of 16 mm and a thickness of 1.9 mm was prepared from this positive electrode compound by compression molding. After placing the blanked nonwoven fabric separator between the negative electrode and the positive electrode, and pouring an electrolyte prepared by mixing propylene carbonate and 1,2-dimethoxy ethane at a volume ratio of 1:1 and dissolving 0.5 mol/l LiClO$_4$ therein, the positive electrode was covered with a stainless steel positive electrode can, and the inlet was sealed with pressure by using a polyphenylene sulfide annular gasket to thereby prepare the battery. The resulting battery exhibited a closed circuit voltage of 2.70 V while the closed circuit voltage after the high-temperature storage test was 2.49 V. The closed circuit voltage after the impact resistance test was 2.38 V. The results are shown in FIG. 3.

Example 7

Spinning and Sheet Formation

A polyphenylene sulfide resin the same as the one used in Example 6 was used for the starting material. The spinning was conducted in the same conditions as Example 6 except that the hot air pressure was 0.18 MPa, and the ejected fibers were collected on the moving belt conveyer located at a distance 100 mm from the spinning nozzle to obtain a nonwoven web (nonwoven fabric) having a unit weight of 80 g/m$^2$ and a thickness of 0.39 mm. The fiber constituting the resulting nonwoven web (nonwoven fabric) had an average fiber diameter of 3.6 µm, and no shot (polymer globule) formation was observed during the 1 hour spinning. A good spinnability was thereby demonstrated.

Heat Treatment of the Nonwoven Fabric

The collected nonwoven web (nonwoven fabric) was heat treated by the same conditions as those of Example 6. The melt-blown nonwoven fabric after the heat treatment had a thickness of 0.28 mm, and the dry heat shrinkage was 0%. No waviness, texture damage, or surface unevenness was observed. The results are shown in FIG. 2.

Physical Properties of the Nonwoven Fabric

The nonwoven fabric after the heat treatment had an apparent density of 0.29 g/cm$^3$ while the tensile strength was 27.1 N/15 mm in machine direction and 19.7 N/15 mm in transverse direction. The surface roughness was 1.03 µm on the side opposite to the collector net and 1.15 µm on the side of the collector net.

Evaluation of the Battery Properties

A coin type lithium battery was prepared in the same conditions as those of Example 6 to evaluate the battery properties. The nonwoven fabric exhibited good blanking workability, and the resulting battery exhibited a closed circuit voltage of 2.68 V while the closed circuit voltage after the high-temperature storage test was 2.47 V. The closed circuit voltage after the impact resistance test was 2.36 V. The results are shown in FIG. 3.

Example 8

Spinning and Sheet Formation

A nonwoven web (nonwoven fabric) was formed under the same conditions as the Example 7.

Heat Treatment of the Nonwoven Fabric

After conducting the heat treatment of the collected nonwoven web (nonwoven fabric) by using the same conditions as those of Example 6, the nonwoven web was nipped at room temperature and linear pressure of 20 kgf/cm by using nip rolls provided at the exit of the belt conveyer. The melt-blown nonwoven fabric after the heat treatment had a thickness of 0.21 mm, and the dry heat shrinkage was 0%. No waviness, texture damage, or surface unevenness was observed. The results are shown in FIG. 2.

Physical Properties of the Nonwoven Fabric

The nonwoven fabric after the heat treatment had an apparent density of 0.38 g/cm$^3$ while the tensile strength was 20.3 N/15 mm in machine direction and 16.6 N/15 mm in transverse direction. The surface roughness was 0.85 µm on the side opposite to the collector net and 1.01 µm on the side of the collector net.

Evaluation of the Battery Properties

A coin type lithium battery was prepared in the same conditions as those of Example 6 to evaluate the battery properties. The nonwoven fabric exhibited good blanking workability, and the resulting battery exhibited a closed circuit voltage of 2.69 V while the closed circuit voltage after the high-temperature storage test was 2.49 V. The closed circuit voltage after the impact resistance test was 2.37 V. The results are shown in FIG. 3.

Example 9

Spinning and Sheet Formation

A polyphenylene sulfide resin the same as the one used in Example 6 was used for the starting material. The spinning was conducted in the same conditions as Example 6 except that the single nozzle ejection rate was 0.30 g/minute, and the hot air pressure was 0.15 MPa, and the ejected fibers were collected on the moving belt conveyer located at a distance 130 mm from the spinning nozzle to obtain a nonwoven web (nonwoven fabric) having a unit weight of 80 g/m² and a thickness of 0.46 mm. The fiber constituting the resulting nonwoven web (nonwoven fabric) had an average fiber diameter of 6.0 μm, and no shot (polymer globule) formation was observed during the 1 hour spinning. A good spinnability was thereby demonstrated.

Heat Treatment of the Nonwoven Fabric

The collected nonwoven web was heat-treated by using the same conditions as those of Example 6. The melt-blown nonwoven fabric after the heat treatment had a thickness of 0.32 mm, and the dry heat shrinkage was 0%. No waviness, texture damage, or surface unevenness was observed. The results are shown in FIG. 2.

Physical Properties of the Nonwoven Fabric

The nonwoven fabric after the heat treatment had an apparent density of 0.25 g/cm³ while the tensile strength was 19.6 N/15 mm in machine direction and 17.9 N/15 mm in transverse direction. The surface roughness was 1.15 μm on the side opposite to the collector net and 1.27 μm on the side of the collector net.

Evaluation of the Battery Properties

A coin type lithium battery was prepared in the same conditions as those of Example 6 to evaluate the battery properties. The nonwoven fabric exhibited good blanking workability, and the resulting battery exhibited a closed circuit voltage of 2.68 V while the closed circuit voltage after the high-temperature storage test was 2.45 V. The closed circuit voltage after the impact resistance test was 2.33 V. The results are shown in FIG. 3.

Example 10

Spinning and Sheet Formation

A polyphenylene sulfide resin the same as the one used in Example 6 was used for the starting material. The spinning was conducted in the same conditions as Example 7 to obtain a nonwoven web (nonwoven fabric) having a unit weight of 50 g/m² and a thickness of 0.32 mm. The fiber constituting the resulting nonwoven web (nonwoven fabric) had an average fiber diameter of 3.6 μm, and no shot (polymer globule) formation was observed during the 1 hour spinning. A good spinnability was thereby demonstrated.

Heat Treatment of the Nonwoven Fabric

The collected nonwoven web was heat treated under the same conditions as those used in the Example 6. The melt-blown nonwoven fabric after the dry heat treatment had a thickness of 0.18 mm, and the dry heat shrinkage was 0%. No waviness, texture damage, or surface unevenness was observed. The results are shown in FIG. 2.

Physical Properties of the Nonwoven Fabric

The nonwoven fabric after the heat treatment had an apparent density of 0.28 g/cm³ while the tensile strength was 16.3 N/15 mm in machine direction and 11.1 N/15 mm in transverse direction. The surface roughness was 0.96 μm on the side opposite to the collector net and 1.12 μm on the side of the collector net.

Evaluation of the Battery Properties

A coin type lithium battery was prepared in the same conditions as those of Example 6 to evaluate the battery properties. The nonwoven fabric exhibited good blanking workability, and the resulting battery exhibited a closed circuit voltage of 2.64 V while the closed circuit voltage after the high-temperature storage test was 2.43 V. The closed circuit voltage after the impact resistance test was 2.33 V. The results are shown in FIG. 3.

Comparative Example 5

Spinning and Sheet Formation

A nonwoven web (nonwoven fabric) was formed under the same conditions as the Example 7.

Heat Treatment of the Nonwoven Fabric

The heat treatment was not conducted. The nonwoven fabric had a thickness 0.39 mm and the dry heat shrinkage was 80%.

Physical Properties of the Nonwoven Fabric

The nonwoven fabric had an apparent density of 0.21 g/cm³ while the tensile strength was 6.0 N/15 mm in machine direction and 3.4 N/15 mm in transverse direction. The surface roughness was 2.22 μm on the side opposite to the collector net and 2.73 μm on the side of the collector net.

Evaluation of the Battery Properties

A coin type lithium battery was prepared in the same conditions as those of Example 6 to evaluate the battery properties. During the blanking of the nonwoven fabric, the nonwoven fabric often became fluffy resulting in the failure, but the battery was prepared by using the successfully blanked nonwoven fabric. The resulting battery exhibited a closed circuit voltage of 2.69 V while the closed circuit voltage after the high-temperature storage test was 1.99 V. The closed circuit voltage after the impact resistance test was 0.62 V. The results are shown in FIG. 3.

Comparative Example 6

Spinning and Sheet Formation

A polyphenylene sulfide resin the same as the one used in Example 6 was used for the starting material. The spinning was conducted in the same conditions as Example 7, and the ejected fibers were collected on the moving belt conveyer located at a distance 150 mm from the spinning nozzle to obtain a nonwoven web (nonwoven fabric) having a unit weight of 50 g/m² and a thickness of 0.39 mm. The fiber constituting the resulting nonwoven web (nonwoven fabric) had an average fiber diameter of 3.6 μm, and no shot (polymer globule) formation was observed during the 1 hour spinning. A good spinnability was thereby demonstrated.

Heat Treatment of the Nonwoven Fabric

The nonwoven web (nonwoven fabric) was conveyed at a speed of 1 m/minute while being held only by pin tenter devices at opposite ends of the nonwoven web, and the heat treatment was conducted by spraying hot air at 140° C. for 60 seconds. The melt-blown nonwoven fabric after the dry heat treatment had a thickness of 0.21 mm, and the dry heat shrinkage was 0%. While no surface unevenness was found, waviness was observed over the entire sheet, and the texture was inferior. The results are shown in FIG. 2.

Physical Properties of the Nonwoven Fabric

The nonwoven fabric after the heat treatment had an apparent density of 0.24 g/cm³ while the tensile strength was 11.9 N/15 mm in machine direction and 7.6 N/15 mm in transverse direction. The surface roughness was 1.59 μm on the side opposite to the collector net and 1.72 μm on the side of the collector net.

Evaluation of the Battery Properties

A coin type lithium battery was prepared in the same conditions as those of Example 6 to evaluate the battery properties. During the blanking of the nonwoven fabric, some of the nonwoven fabrics became fluffy resulting in the failure, but the battery was prepared by using the successfully blanked nonwoven fabric. The resulting battery exhibited a closed circuit voltage of 2.65 V while the closed circuit voltage after the high-temperature storage test was 2.43 V. The closed circuit voltage after the impact resistance test was 0.87 V. The results are shown in FIG. 3.

TABLE 2

|  | Unit | Ex. 6 | Ex. 7 | Ex. 8 | Ex. 9 | Ex. 10 | Comp. Ex. 5 | Comp. Ex. 6 |
|---|---|---|---|---|---|---|---|---|
| Resin Main component | — | PPS | PPS | PPS | PPS | PPS | PPS | PPS |
| Melting point | °C. | 281 | 281 | 281 | 281 | 281 | 281 | 281 |
| MFR | g/10 min | 600 | 600 | 600 | 600 | 600 | 600 | 600 |
| IV | — | — | — | — | — | — | — | — |
| Spinning Spinning temperature | °C. | 310 | 310 | 310 | 310 | 310 | 310 | 310 |
| Nozzle diameter | Mm | φ 0.40 | φ 0.40 | φ 0.40 | φ 0.40 | φ 0.40 | φ 0.40 | φ 0.40 |
| Amount extruded from single nozzle | g/min | 0.23 | 0.23 | 0.23 | 0.30 | 0.23 | 0.23 | 0.23 |
| Hot air temperature | °C. | 325 | 325 | 325 | 325 | 325 | 325 | 325 |
| Hot air pressure | Mpa | 0.20 | 0.18 | 0.18 | 0.15 | 0.18 | 0.18 | 0.18 |
| Average fiber diameter | μm | 2.6 | 3.6 | 3.6 | 6.0 | 3.6 | 3.6 | 3.6 |
| Fabric production Unit weight | g/m² | 80 | 80 | 80 | 80 | 50 | 80 | 50 |
| Thickness | Mm | 0.38 | 0.39 | 0.38 | 0.46 | 0.32 | 0.39 | 0.39 |
| Heat treatment Belt material | — | "Teflon" resin | "Teflon" resin | "Teflon" resin | "Teflon" resin | "Teflon" resin | — | — |
| Belt thickness | Mm | 0.34 | 0.34 | 0.34 | 0.34 | 0.34 | — | — |
| Bekk smoothness of the belt surface | Sec | 2.6 | 2.6 | 2.6 | 2.6 | 2.6 | — | — |
| Belt clearance | Mm | 0 | 0 | 0 | 0 | 0 | — | — |
| Conveying speed | m/min | 2 | 2 | 2 | 2 | 2 | — | 1 |
| Heat treatment Temperature | °C. | 140 | 140 | 140 | 140 | 140 | — | 140 |
| Heat treatment time | Sec | 30 | 30 | 30 | 30 | 30 | — | 60 |
| Physical properties and outer appearance Thickness | Mm | 0.27 | 0.28 | 0.21 | 0.32 | 0.18 | 0.39 | 0.21 |
| Apparent density | g/cm³ | 0.30 | 0.29 | 0.38 | 0.25 | 0.28 | 0.21 | 0.24 |
| Tensile strength (MD/TD) | N/15 mm | 28.0/20.6 | 27.1/19.7 | 20.3/16.6 | 19.6/17.9 | 16.3/11.1 | 6.0/3.4 | 11.9/7.6 |
| Dry heat shrinkage | % | 0 | 0 | 0 | 0 | 0 | 80 | 0 |
| Waviness | — | A | A | A | A | A | — | C |
| Texture | — | A | A | A | A | A | — | C |
| Surface unevenness | — | A | A | A | A | A | — | A |
| Surface roughness (non-collector net side/collector net side) | μm | 0.93/1.06 | 1.03/1.15 | 0.85/1.01 | 1.15/1.27 | 0.96/1.12 | 2.22/2.73 | 1.59/1.72 |

(Note)
"Teflon" (registered trademark) resin: polytetrafluoroethylene resin.

As shown in Table 2, the melt-blown nonwoven fabric obtained by contact heat treatment at a temperature not lower than cold crystallization temperature of the thermoplastic resin and not higher than the temperature −3° C. lower than melting temperature of the thermoplastic resin by sufficiently holding the entire surface of the nonwoven web by the belt conveyers each having the flexible belt was a nonwoven fabric with good texture and excellent thermal size stability with no waviness of the sheet or surface unevenness.

In addition, our melt-blown nonwoven fabrics exhibited superior thermal size stability compared to the nonwoven fabrics of the Comparative Example 5 which has not been subjected to the heat treatment and lower surface roughness compared to the nonwoven fabric of the Comparative Example 6 which has been subjected to the heat treatment using pin tenters.

TABLE 3

|  | Unit | Ex. 6 | Ex. 7 | Ex. 8 | Ex. 9 | Ex. 10 | Comp. Ex. 3 | Comp. Ex. 4 | Comp. Ex. 5 | Comp. Ex. 6 |
|---|---|---|---|---|---|---|---|---|---|---|
| Properties of the nonwoven fabric Unit weight | g/m² | 80 | 80 | 80 | 80 | 50 | 80 | 80 | 80 | 50 |
| Average filament diameter | μm | 2.6 | 3.6 | 3.6 | 6.0 | 3.6 | 4.6 | 3.6 | 3.6 | 3.6 |
| Thickness | mm | 0.27 | 0.28 | 0.21 | 0.32 | 0.18 | 0.26 | 0.10 | 0.39 | 0.21 |
| Apparent density | g/cm³ | 0.30 | 0.29 | 0.38 | 0.25 | 0.28 | 0.31 | 0.80 | 0.21 | 0.24 |
| Tensile strength (MD/TD) | N/15 mm | 28.0/20.6 | 27.1/19.7 | 20.3/16.6 | 19.6/17.9 | 16.3/11.1 | 26.1/17.2 | 25.9/19.4 | 6.0/3.4 | 11.9/7.6 |
| Dry heat shrinkage | % | 0 | 0 | 0 | 0 | 0 | 0 | 0 | 80 | 0 |
| Surface roughness (non-collector net side/collector net side) | μm | 0.93/1.06 | 1.03/1.15 | 0.85/1.01 | 1.15/1.27 | 0.96/1.12 | 2.11/2.29 | 0.57/0.62 | 2.22/2.73 | 1.59/1.72 |

TABLE 3-continued

|  |  | Unit | Ex. 6 | Ex. 7 | Ex. 8 | Ex. 9 | Ex. 10 | Comp. Ex. 3 | Comp. Ex. 4 | Comp. Ex. 5 | Comp. Ex. 6 |
|---|---|---|---|---|---|---|---|---|---|---|---|
| Properties of the battery | Closed circuit voltage | V | 2.70 | 2.68 | 2.69 | 2.68 | 2.64 | 2.64 | 2.61 | 2.69 | 2.65 |
|  | Closed circuit voltage after high-temperature storage test | V | 2.49 | 2.47 | 2.49 | 2.45 | 2.43 | 2.36 | 2.39 | 1.99 | 2.43 |
|  | Closed circuit voltage after impact resistance test | V | 2.38 | 2.36 | 2.37 | 2.33 | 2.33 | 1.33 | 2.26 | 0.62 | 0.87 |

As shown in Table 3, the nonwoven fabric battery separator prepared by using the melt-blown nonwoven fabric had higher closed circuit voltage and superior current properties compared to the high density separator of the Comparative Example 4 which had been subjected to the calendaring; and also, superior closed circuit voltage after the high-temperature storage test and the closed circuit voltage after the impact resistance test compared to the separator of the Comparative Example 5 exhibiting the high dry heat shrinkage, the separator of the Comparative Example 6 exhibiting the low tensile strength, and the separator of the Comparative Example 3 exhibiting the high surface roughness.

The invention claimed is:

1. A melt-blown nonwoven fabric comprising a fiber having an average diameter of 0.1 to 8.0 μm and containing a thermoplastic resin as its main component, wherein apparent density is 0.1 to 0.4 g/cm$^3$ and KES surface roughness of at least one surface of the fabric sheet is 0.1 to 1.2 μm.

2. The melt-blown nonwoven fabric according to claim 1, wherein dry heat shrinkage at a temperature of 200° C. is up to 2%.

3. The melt-blown nonwoven fabric according to claim 1, wherein both tensile strength in a machine direction and tensile strength in a transverse direction are at least 10 N/15 mm.

4. The melt-blown nonwoven fabric according to claim 1, wherein KES surface roughness of both surfaces of the fabric sheet is up to 1.6 μm.

5. The melt-blown nonwoven fabric according to claim 1, wherein thickness of the nonwoven fabric is 0.12 to 0.35 mm.

6. The melt-blown nonwoven fabric according to claim 1, wherein the thermoplastic resin, which is the main component of the fiber constituting the nonwoven fabric, is a polyphenylene sulfide resin or a polyester resin.

7. A nonwoven fabric battery separator produced by using the melt-blown nonwoven fabric of claim 1.

8. A method of producing a melt-blown nonwoven fabric comprising:
conveying a web of nonwoven fabric comprising a fiber having an average diameter of 0.1 to 8.0 μm and containing a thermoplastic resin as its main component by sandwiching the web between two sets of belt conveyers each comprising a belt of flexible material having a smooth surface;
providing a heat treatment zone where a surface of one or both of the two sets of the belt conveyers has been heated to a temperature not lower than cold crystallization temperature of the thermoplastic resin and not higher than the temperature −3° C. lower than melting temperature of the thermoplastic resin in at least a part of a course where the nonwoven fabric is conveyed between the belts; and
heating the nonwoven fabric web in the heat treatment zone by bringing both surfaces of the nonwoven fabric web in contact with the belt conveyers,
wherein time of contact between the nonwoven web and the belt conveyers in the heat treatment zone is 3 to 600 seconds.

9. The method according to claim 8, wherein Bekk smoothness of the belt is at least 0.5 second.

10. The method according to claim 8, wherein the nonwoven web is conveyed at a speed of 0.1 to 10 m/minute.

11. The method according to claim 8, wherein the main component of the fiber constituting the nonwoven fabric is a polyphenylene sulfide resin or a polyester resin.

12. The melt-blown nonwoven fabric according to claim 1, wherein the apparent density is 0.21 to 0.4 g/cm$^3$.

* * * * *